US010880624B2

(12) United States Patent
Li et al.

(10) Patent No.: US 10,880,624 B2
(45) Date of Patent: Dec. 29, 2020

(54) SYSTEMS AND METHODS FOR WIRELESSLY COMMUNICATING WITHIN ELECTRIC MOTOR SYSTEMS

(71) Applicant: Regal Beloit America, Inc., Beloit, WI (US)

(72) Inventors: Ming Li, Fort Wayne, IN (US); Roger Carlos Becerra, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 15/703,356

(22) Filed: Sep. 13, 2017

(65) Prior Publication Data

US 2019/0082240 A1   Mar. 14, 2019

(51) Int. Cl.
| | |
|---|---|
| *H04Q 9/00* | (2006.01) |
| *H02K 11/33* | (2016.01) |
| *H02K 11/35* | (2016.01) |
| *F24F 11/30* | (2018.01) |
| *F24F 11/62* | (2018.01) |
| *F24F 11/49* | (2018.01) |
| *H04W 84/18* | (2009.01) |
| *F24F 11/63* | (2018.01) |
| *F24F 11/58* | (2018.01) |

(Continued)

(52) U.S. Cl.
CPC ............... *H04Q 9/00* (2013.01); *F24F 11/30* (2018.01); *F24F 11/49* (2018.01); *F24F 11/62* (2018.01); *H02K 11/33* (2016.01); *H02K 11/35* (2016.01); *F24F 11/58* (2018.01); *F24F 11/63* (2018.01); *F24F 2110/10* (2018.01); *F24F 2110/50* (2018.01); *H04Q 2209/40* (2013.01); *H04Q 2209/43* (2013.01); *H04Q 2209/84* (2013.01); *H04W 84/18* (2013.01)

(58) Field of Classification Search
CPC .. H04Q 9/00; H04Q 2209/40; H04Q 2209/84; H02K 11/33; H02K 11/35; F24F 11/62; F24F 11/30; F24F 11/58; H04W 84/18
See application file for complete search history.

(56) References Cited

U.S. PATENT DOCUMENTS

| | | | |
|---|---|---|---|
| 5,917,428 A * | 6/1999 | Discenzo | G01R 31/343 307/116 |
| 6,005,310 A | 12/1999 | Mosciatti et al. | |
| 7,652,439 B2 | 1/2010 | Tang | |

(Continued)

FOREIGN PATENT DOCUMENTS

WO    2011086994 A1    7/2011

*Primary Examiner* — Amine Benlagsir
(74) *Attorney, Agent, or Firm* — Armstrong Teasdale LLP (57) ABSTRACT

An electric motor communication system for use with a fluid moving system and using at least one wireless sensor network is provided. The electric motor communication system includes an electric motor that includes a motor management device configured to transmit and receive input signals via the wireless sensor network, and a processing device coupled to said motor management device and configured to control said electric motor based at least in part on input signals received at said motor management device. The electric motor communication system also includes at least one external device configured to collect data and to transmit said input signals, via the wireless sensor network, to said electric motor.

20 Claims, 8 Drawing Sheets

(51) Int. Cl.
*F24F 110/50* (2018.01)
*F24F 110/10* (2018.01)

(56) References Cited

U.S. PATENT DOCUMENTS

| | | | |
|---|---|---|---|
| 7,656,105 | B2 | 2/2010 | Chen |
| 8,917,045 | B2 | 12/2014 | Durfee et al. |
| 9,160,269 | B2 | 10/2015 | Wilson et al. |
| 9,196,153 | B2 | 11/2015 | Zeng |
| 9,491,242 | B2 | 11/2016 | Bomkamp et al. |
| 9,590,413 | B2 | 3/2017 | Wallis et al. |
| 9,599,383 | B2 | 3/2017 | Mangum |
| 9,614,475 | B2 | 4/2017 | Nardin |
| 9,661,835 | B1 | 5/2017 | Sandstrom |
| 9,708,047 | B2 | 7/2017 | Limseth |
| 9,745,797 | B2 | 8/2017 | Mullet et al. |
| 2007/0178823 | A1* | 8/2007 | Aronstam ............ F24F 3/00 454/256 |
| 2009/0300270 | A1* | 12/2009 | Shahi ............ G06F 12/00 711/103 |
| 2010/0163633 | A1* | 7/2010 | Barrett ............ F24F 13/082 236/49.3 |
| 2012/0223662 | A1 | 9/2012 | Cheuk |
| 2014/0079564 | A1* | 3/2014 | Becerra ............ F04D 15/0066 417/53 |
| 2015/0148970 | A1 | 5/2015 | Guzelgunler et al. |
| 2015/0226805 | A1 | 8/2015 | Albers et al. |
| 2015/0296050 | A1* | 10/2015 | Bomkamp ............ H04L 67/12 709/217 |
| 2016/0028559 | A1 | 1/2016 | Bernard et al. |
| 2016/0170917 | A1 | 6/2016 | Roh |
| 2016/0292737 | A1 | 10/2016 | Barnes, Jr. |
| 2016/0365818 | A1 | 12/2016 | Shahi et al. |
| 2017/0048324 | A1 | 2/2017 | Bomkamp et al. |
| 2017/0212530 | A1 | 7/2017 | Potucek et al. |
| 2017/0264171 | A1* | 9/2017 | Williams ............ H02K 5/15 |

* cited by examiner

SYSTEMS AND METHODS FOR WIRELESSLY COMMUNICATING WITHIN ELECTRIC MOTOR SYSTEMS

BACKGROUND

The field of the disclosure relates generally to electric motor control systems, and more particularly, to wireless communications between electric motors and other devices using a wireless sensor network.

At least some known motor control systems include power switches for generating a motor control signal for an electric motor. The motor control systems may further include a wireless communication interface to facilitate remote control of the motor control system and thereby the electric motor. Some motor control systems may include both the power switches and the wireless communication interface within one package, printed circuit board (PCB), or other enclosure.

At least some known electric motors are coupled to a power control system by one or more wireless network (e.g., Wi-Fi™). Electric motors may also be connected to other external devices. These wireless networks require additional hardware that enables the transmission of wireless signals between the electric motors and other devices. Furthermore, the transmission of the wireless signals is subject to the additional hardware functioning properly and a wireless network provider delivering the wireless signals.

BRIEF DESCRIPTION

In one aspect, an electric motor communication system for use with a fluid moving system and using at least one wireless sensor network is provided. The electric motor communication system includes an electric motor that includes a motor management device configured to transmit and receive input signals via the wireless sensor network, and a processing device coupled to said motor management device and configured to control said electric motor based at least in part on input signals received at said motor management device. The electric motor communication system also includes at least one external device configured to collect data and to transmit said input signals, via the wireless sensor network, to said electric motor.

In another aspect, an electric motor for use in a fluid-moving system in communication with a wireless sensor network is provided. The electric motor includes a motor management device configured to transmit and receive input signals, via the wireless sensor network, to and from at least one external device, and a processing device coupled to said motor management device and configured to control said electric motor based at least in part on input signals received at said motor management device.

In yet another aspect, a method of operating an electric motor in a fluid-moving system and performed using a wireless sensor network is provided. The method includes communicatively coupling the electric motor to at least one external device, via the wireless sensor network, the electric motor including a motor management device and a processing device coupled to the motor management device. The method also includes receiving, at the motor management device, input signals from the at least one external device, and controlling, using the processing device, the electric motor based at least in part on the received input signals.

DETAILED DESCRIPTION

The methods and systems described herein facilitate efficient and economical operation of electric motor systems. As described herein, an electric motor communication system includes at least one electric motor including a motor management device and a processing device. Using the motor management device, the electric motor interfaces with a plurality of external devices without requiring physical connections and a wireless sensor network (WSN) between the external devices and the electric motor. The electric motor is configured to operate within itself. That is, the electric motor is able to control its operations without an external controller.

Technical effects of the methods and systems described herein include at least one of: (a) communicatively coupling an electric motor to at least one external device; (b) receiving and transmitting input signals from the at least one external device; (c) controlling the electric motor based at least in part on the received input signals; (d) controlling the electric within itself without the need of an external controller; and (e) troubleshooting the electric motor based at least in part on the transmitted signals.

Figure 1:
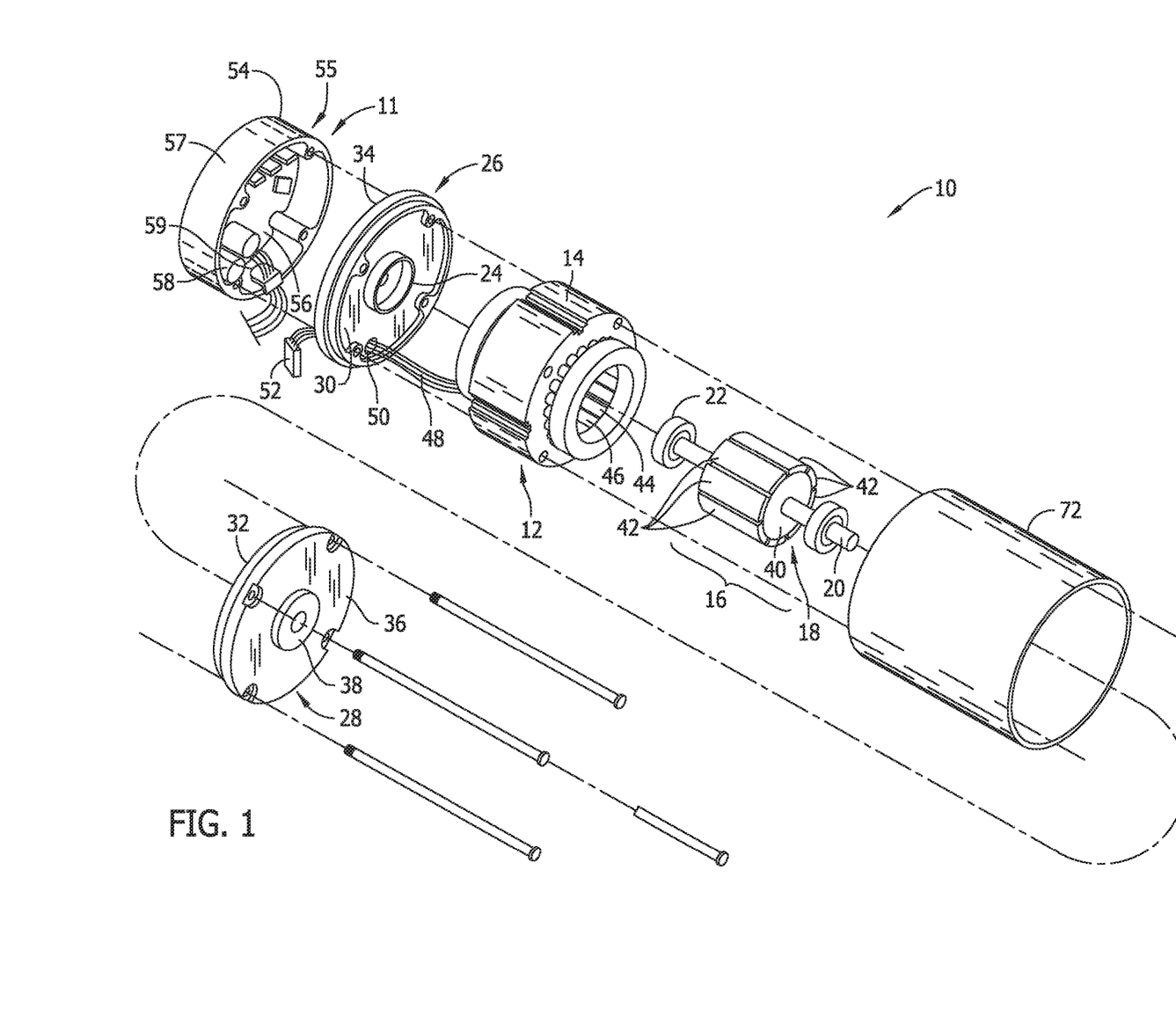
FIG. 1 is an exploded view of an exemplary electric motor.

FIG. 1 is an exploded view of an exemplary electric motor 10. Electric motor 10 includes control system 11, a stationary assembly 12 including a stator or core 14, and a rotatable assembly 16 including a rotor 18 and a shaft 20. In the exemplary embodiment, electric motor 10 is utilized as a fan and/or blower motor in a fluid (e.g., water, air, etc.) moving system. For example, electric motor 10 may be utilized in a clean room filtering system, a fan filter unit, a variable air volume system, a refrigeration system, a furnace system, an air conditioning system, and/or a residential or commercial heating, ventilation, and air conditioning (HVAC) system. Alternatively, electric motor 10 may be implemented in any application that enables electric motor 10 to function as described herein. Electric motor 10 may also be used to drive mechanical components other than a fan and/or blower, including mixers, compressors, gears, conveyors, and/or treadmills. In the exemplary embodiment, control system 11 is integrated with electric motor 10. Alternatively, electric motor 10 may be external to and/or separate from control system 11.

Rotor 18 is mounted on and keyed to shaft 20 journaled for rotation in conventional bearings 22. Bearings 22 are mounted in bearing supports 24 integral with a first end member 26 and a second end member 28. End members 26 and 28 have inner facing sides 30 and 32 between which stationary assembly 12 and rotatable assembly 16 are located. Each end member 26 and 28 has an outer side 34 and 36 opposite its inner side 30 and 32. Additionally, second end member 28 has an aperture 38 for shaft 20 to extend through outer side 36.

Rotor 18 comprises a ferromagnetic core 40 and is rotatable within stator 14. Segments 42 of permanent magnet material, each providing a relatively constant flux field, are secured, for example, by adhesive bonding to rotor core 40. Segments 42 are magnetized to be polarized radially in relation to rotor core 40 with adjacent segments 42 being alternately polarized as indicated. While magnets on rotor 18 are illustrated for purposes of disclosure, it is contemplated that other rotors having different constructions and other magnets different in both number, construction and flux fields may be utilized with such other rotors within the scope of the invention.

Stationary assembly 12 comprises a plurality of winding stages 44 adapted to be electrically energized to generate an electromagnetic field. Stages 44 are coils of wire wound around teeth 46 of laminated stator core 14. Winding terminal leads 48 are brought out through an aperture 50 in first end member 26 terminating in a motor connector 52. While stationary assembly 12 is illustrated for purposes of disclosure, it is contemplated that other stationary assemblies of various other constructions having different shapes and with different number of teeth may be utilized within the scope of the invention.

Electric motor 10 further includes an electronics enclosure 54 that mounts on the rear portion of electric motor 10 to house control system 11. Electronics enclosure 54 includes a bottom wall 56 and a substantially annular side wall 57. Electronics enclosure 54 defines an internal chamber (not shown) in which control system 11 is positioned. Electronics enclosure 54 and control system 11 may sometimes be referred to collectively as a motor control assembly 55. Control system 11 includes a plurality of electronic components 58 and a connector 59 mounted within electronics enclosure 54. Control system 11 is connected to winding stages 44 by interconnecting motor connector 52. Control system 11 applies a voltage to one or more of winding stages 44 at a time for commutating winding stages 44 in a preselected sequence to rotate rotatable assembly 16 about an axis of rotation. In an alternative embodiment, control system 11 is remotely positioned from and communicatively coupled to electric motor 10. In another alternative embodiment, control system 11 is a central control system for more than one electric motor (e.g., in an HVAC system), and is communicatively coupled to electric motor 10.

A casing 72 is positioned between first end member 26 and second end member 28 to facilitate enclosing and protecting stationary assembly 12 and rotatable assembly 16.

Figure 2:
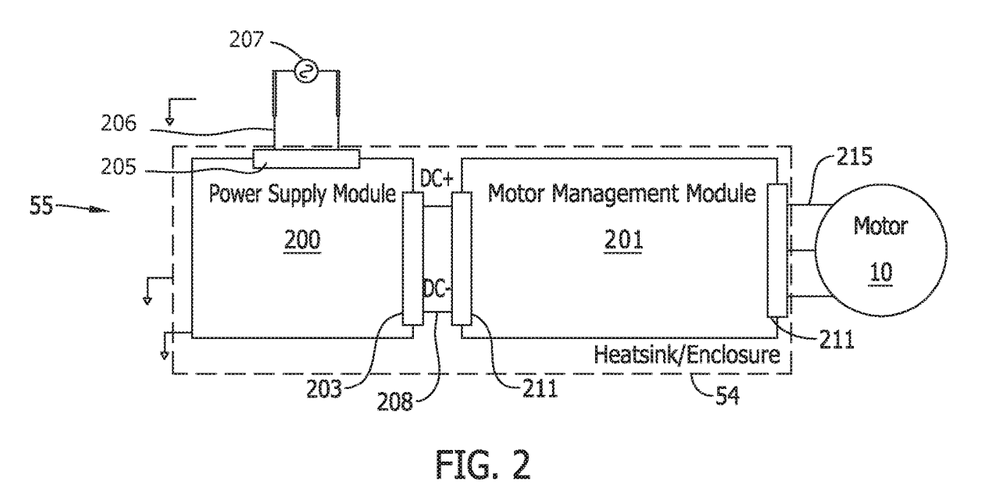
FIG. 2 is a block diagram of an exemplary motor control assembly for controlling operation of the electric motor shown in FIG. 1, including a motor management device.
Figure 3:
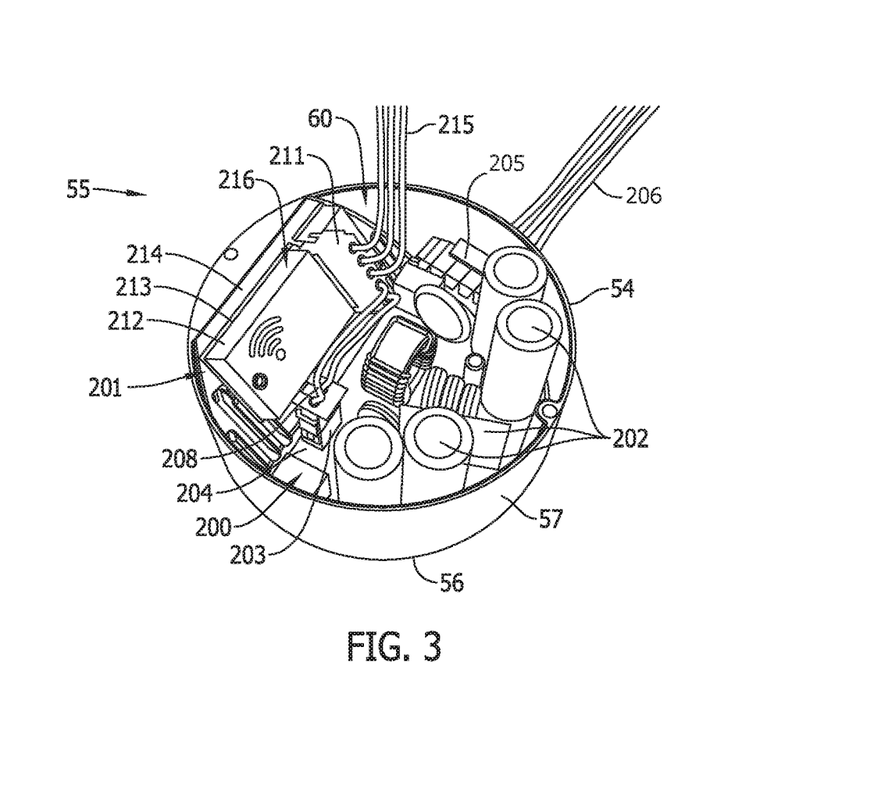
FIG. 3 is a perspective view of the motor control assembly shown in FIGS. 1 and 2, including the motor management device.
Figure 4:
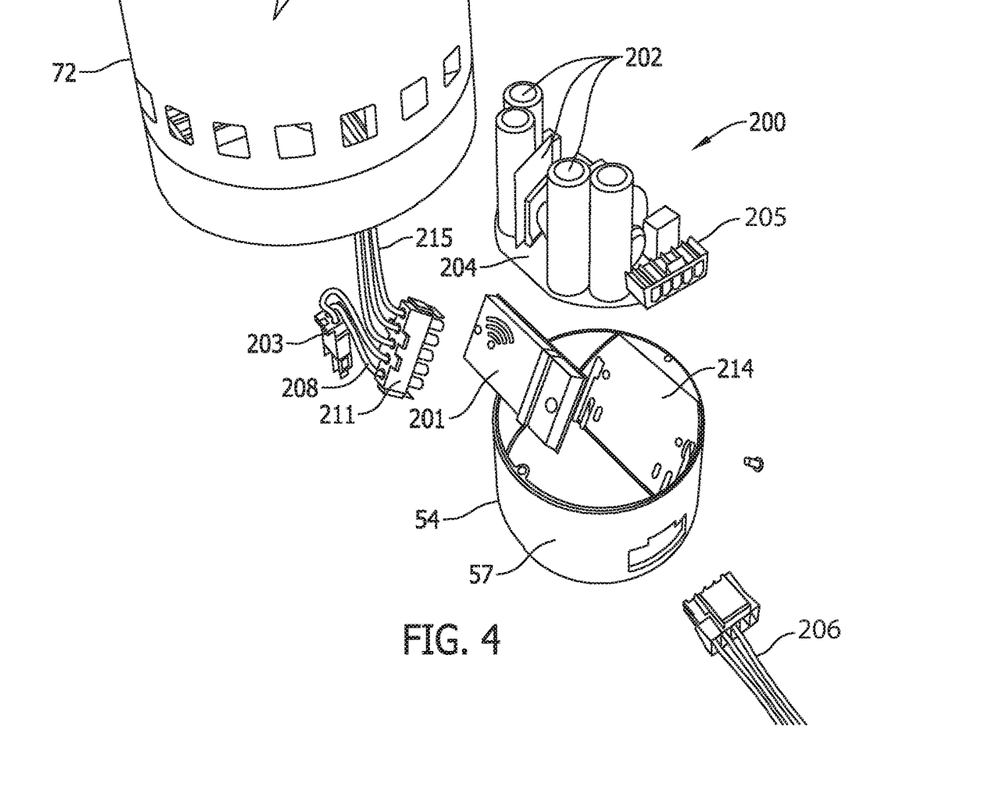
FIG. 4 is a schematic diagram of exemplary sensors and a data management system of the motor controller shown in FIG. 2.

FIG. 2 is a block diagram of an exemplary motor control assembly 55 for controlling operation of electric motor 10 including a motor management device (not shown) for receiving and transmitting input signals. FIG. 3 is a perspective view of motor control assembly 55 including the motor management device. FIG. 4 is an exploded perspective view of motor control assembly 55. In the exemplary embodiment, motor control assembly 55 includes electronics enclosure 54 and internal chamber 60, which houses control system 11 (shown in FIG. 1). Control system 11 includes a power supply module 200 and motor management module 201 that is physically separate from, but in electrical connection with power supply module 200.

Power supply module 200 includes a plurality of electrical components 202, an output connector 203 mounted on a component board, such as a printed circuit board (PCB) 204, and an input connector 205. Power supply module 200 integrates large through-hole electrical components 202 and power connectors of control system 11. In the exemplary embodiment, PCB 204 is coupled to an interior surface of bottom wall 56 of electronics enclosure 54.

In the exemplary embodiment, input connector 205 includes power input line connectors 206 for coupling to a power source 207. Input connector 205 interfaces with and receives input power from power source 207 via an opening inside wall 57 of electronics enclosure 54.

Electrical components 202 of power supply module 200 are configured to convert input voltage received from power source 207 to a desired level of direct current (DC) voltage. Using output connector 203, power supply module 200 outputs the converted DC voltage to motor management module 201. Output connector 203 includes two high-voltage wires 208 for providing the converted DC voltage to motor management module 201.

Motor management module 201 includes an input/output connector 211 and electrical components 202. Motor management module 201 houses moisture-sensitive electrical components 202 of control system 11 within an encapsulated, heat-sharing package 212 that provides protection from damage and/or failure due to moisture entering electronics enclosure 54, as described in more detail herein.

Heat-sharing package 212 includes an insulated metal substrate 213 coupled to a metal heatsink 214 formed in side wall 57 of electronics enclosure 54. For example, heat-sharing package 212 may include an insulated metal substrate (IMS) or a thick printed copper (TPC) based packaging to integrate high power semiconductor devices and all moisture-sensitive components such as integrated circuits and surface mount resistors. Heat generated by electrical losses of the semiconductor devices causes the elements mounted on the heat sharing package 212 to operate at relatively higher temperatures.

Input/output connector 211 is coupled to high-voltage wires 208 for receiving the converted DC voltage from power supply module 200. Motor management module 201 converts the DC voltage to a three-phase alternating current (AC) voltage for driving electric motor 10 based on instructions received from external devices (not shown). Input/output connector 211 outputs the three-phase AC voltage to winding stages 44 (shown in FIG. 1) of electric motor 10 via output power wires 215.

In the exemplary embodiment, motor management device 216 is communicatively coupled to the external devices as well as other electric motors 10. More specifically, in the exemplary embodiment motor management device 216 is communicatively coupled to the external devices and other electric motors 10 using a WSN that transmits the input signals. The input signals may be sensor input signals. In some embodiments, the input signals are transmitted by the external devices and received by one or more electric motors 10. In other embodiments, the input signals are transmitted from one or more electric motors 10 and received by the external devices. In yet other embodiments, the input signals are transmitted from and received by one or more electric motors 10. In some embodiments, a wired communication connection may transmit the input signals. In the example embodiment, the input signals include Bluetooth® and Bluetooth® Low Energy (BLE®) signals. In alternative embodiments, the input signals may include, but are not limited to, near field communications (NFC), infrared, Wi-Fi™, and/or any other known types of input signals.

In some embodiments, motor management device 216 is controlled by a user, such as an original equipment manufacturer (OEM), and enables control of motor operation by transmitting control signals to the external devices and other electric motors 10.

Figure 5:
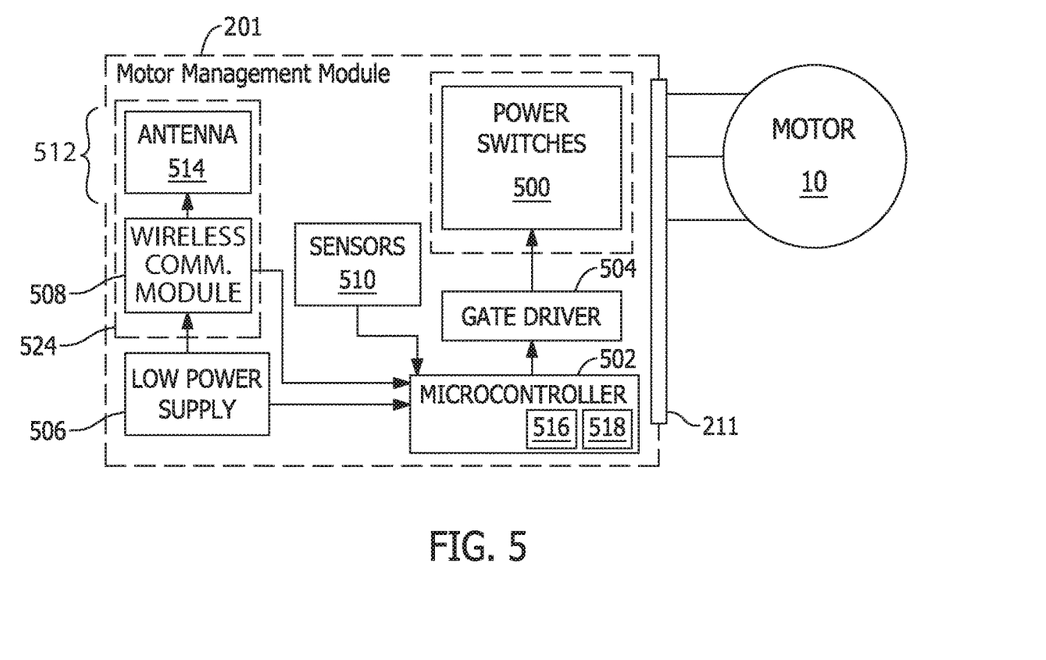
FIG. 5 is a schematic diagram of a motor management system of the motor controller shown in FIG. 2.

FIG. 5 is a block diagram of an exemplary motor management module 201. In the exemplary embodiment, motor management module 201 includes input/output connector 211 for receiving the DC voltage from power supply module 200 (shown in FIG. 2), power semiconductor switches 500 for switching the DC power to the motor phases as AC power, a microcontroller 502 for implementing an algorithm to control one or more gate drivers 504 to operate power semiconductor switches 500, a low voltage power supply 506 and associated internal circuitry for providing low voltage power to microcontroller 502 from a higher voltage that is applied to entire motor management module 201, and input/output connector 211 for coupling to motor winding stages. In the exemplary embodiment, low voltage power supply 506 is a DC-DC converter that supplies low voltage sources to microcontroller 502 and to a wireless communications module 508, such as motor management device 216 (shown in FIG. 3).

In the exemplary embodiment, motor management module 201 also includes a plurality of sensors 510 for providing data to microcontroller 502. Sensors 510 are configured to measure various operating parameters associated with the operation of electric motor 10, including voltage measurements, current measurements, temperature measurements, vibration measurements, and/or any other known measurements associated with operating an electric motor or the operating environment. Sensors 510 are contained within heat-sharing package 212 (shown in FIG. 3) and do not require penetration out of sharing package 212, which would create potential for moisture penetration.

In the exemplary embodiment, motor management module 201 includes wireless communication module 508 for communicating with external devices and other electric motors 10 to receive a motor control command signal, which is used by microcontroller 502 to switch power semiconductor switches 500 to drive electric motor 10 at an appropriate level. Wireless communication module 508 communicates with one or more remote devices, such as the external devices and other electric motors 10. In the exemplary embodiment, wireless communication module 508 converts a received input signal into a control signal that microcontroller 502 utilizes to control operation of electric motor 10. By using wireless communication module 508 to communicate with the external devices and other electric motors 10, hardwired communication connectors are eliminated. Such hardwired connectors are a common entry point for moisture, so their removal makes electric motor 10 more resistant to moisture. In addition, the number of hardwires is reduced facilitating maintenance of electric motor 10.

In some embodiments, casing 72 and/or electronics enclosure 54 (both shown in FIG. 1) are manufactured using metal, which may interfere with input signals being transmitted to microcontroller 502. As such, motor management module 201 may be positioned adjacent to an opening 512 defined in casing 72 or electronics enclosure 54. Motor management module 201 includes an antenna 514 within the over-molded portion of heat-sharing package 212 such that an input signal entering electronics enclosure 54 via opening 512 penetrates sharing package 212 and is received by antenna 514. Antenna 514 enables wireless communication between a user of electric motor 10 (i.e., a manufacturer of electric motor 10, an HVAC system manufacturer using electric motor 10, a technician of electric motor 10, and/or a customer owning electric motor 10) with microcontroller 502 to define, change, or override the operating parameters stored in a microcontroller memory device. Positioning antenna 514 adjacent to opening 512 enables input signals to be received by antenna 514 and transmitted to microcontroller 502. In some embodiments, antenna 514 is a three-dimensional (3D) antenna or a ceramic antenna. In other embodiments, other suitable types of antennas may be used.

In the exemplary embodiment, microcontroller 502 includes at least one memory device 516 and a processor 518 that is communicatively coupled to memory device 516 for executing instructions. In some embodiments, executable instructions are stored in memory device 516. In the exemplary embodiment, microcontroller 502 performs one or more operations described herein by programming processor 518. For example, processor 518 may be programmed by encoding an operation as one or more executable instructions and by providing the executable instructions in memory device 516.

Processor 518 may include one or more processing units (e.g., in a multi-core configuration). Further, processor 518 may be implemented using one or more heterogeneous processor systems in which a main processor is present with secondary processors on a single chip. As another illustrative example, processor 518 may be a symmetric multi-processor system containing multiple processors of the same type. Further, processor 518 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 518 controls operation of microcontroller 502.

In the exemplary embodiment, memory device 516 is one or more devices that enable information such as executable instructions and/or other data to be stored and retrieved. Memory device 516 may include one or more computer readable media, such as, without limitation, an NFC electrically erasable programmable read-only memory (EEPROM), a standard EEPROM, dynamic random access memory (DRAM), static random access memory (SRAM), a solid state disk, and/or a hard disk. Memory device 516 may be configured to store, without limitation, application source code, application object code, source code portions of interest, object code portions of interest, configuration data, execution events, and/or any other type of data. In the exemplary embodiment, memory device 516 includes firmware and/or initial motor configuration data for microcontroller 502. Moreover, in the exemplary embodiment, memory device 516 stores diagnostic data associated with operation of electric motor 10, for transmission to one or more external devices upon request. Diagnostic data includes, but is not limited to including, time powered, time run, time run above 80% demand, time in speed cutback region, time in temperature cutback region, good starts, failed starts, resets, stalls, number of bad serial packets received, watchdog shutdown events, time run in certain demand ranges, thermal shock events, power module temperature, bus voltage, open-phase events, UL lockouts, reverse start attempts, shaft watts, and torque.

Figure 6A:
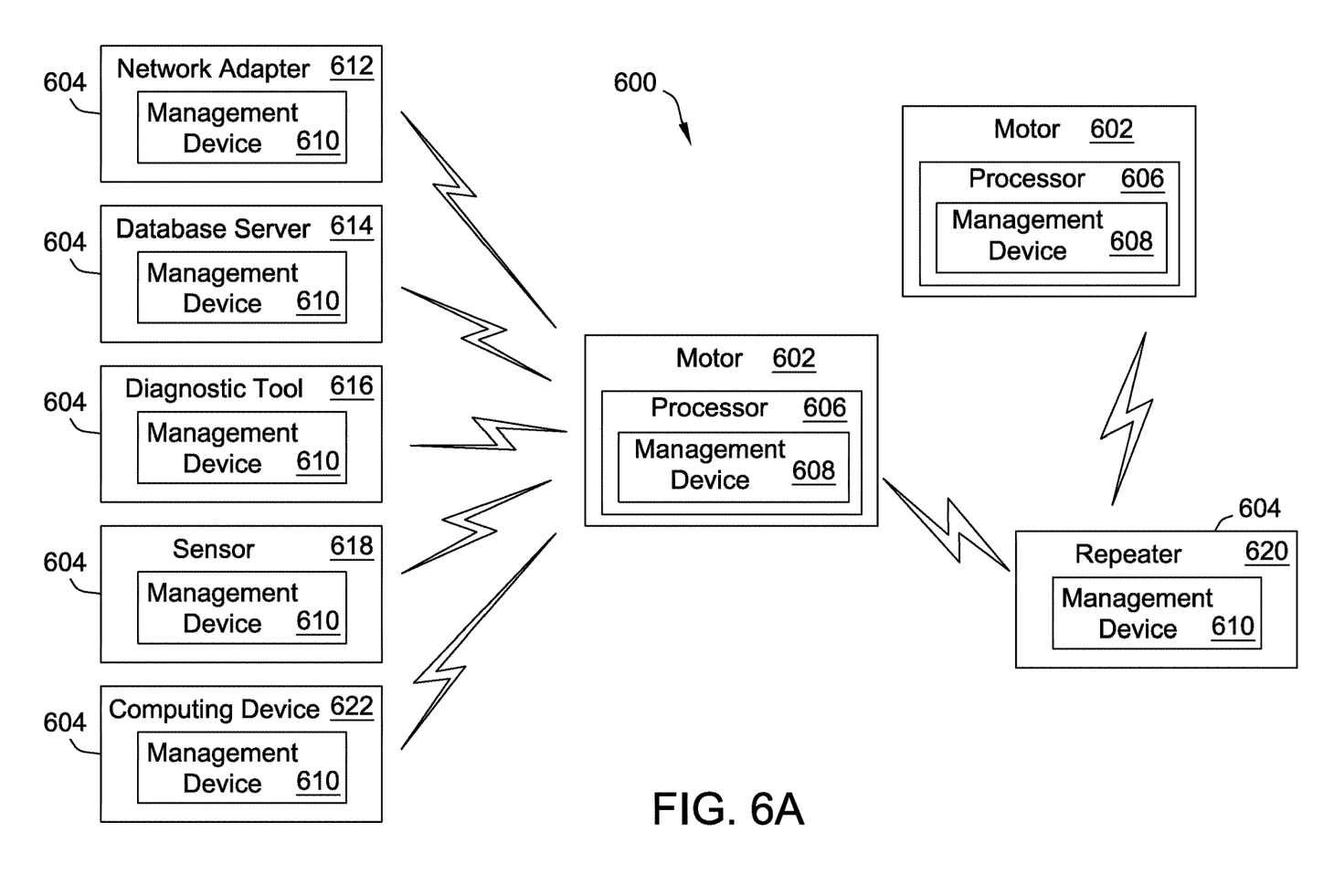
FIG. 6A is a schematic diagram of an exemplary motor communication system that may be used with the electric motor shown in FIG. 1.

FIG. 6A is a schematic diagram of an exemplary electric motor communication system 600. Electric motor communication system 600 includes at least one electric motor 602, similar to electric motor 10 (shown in FIG. 1), and a plurality of external devices 604. As described in detail herein, electric motor 602 is communicatively coupled to one or more external devices 604 and other electric motors 602 such that electric motor 602 is capable of bi-directional wireless communication with one or more external devices 604 and/or other electric motors 602. More specifically, any electric motor 602 within a WSN is capable of wirelessly communicating with external devices 604 and/or other electric motors 602.

In the exemplary embodiment, electric motor 602 is utilized as a fan and/or blower motor in a fluid (e.g., water, air, etc.) moving system. For example, electric motor 602 may be utilized in a clean room filtering system, a fan filter unit, a variable air volume system, a refrigeration system, a furnace system, an air conditioning system, and/or a residential or commercial heating, ventilation, and air conditioning (HVAC) system. Alternatively, electric motor 602 may be implemented in any application that enables electric motor communication system 600 to function as described herein. Electric motor 602 may also be used to drive mechanical components other than a fan and/or blower, including mixers, compressors, gears, conveyors, and/or treadmills.

Electric motor 602 includes a processor 606 that controls operation of electric motor 602 and facilitates wireless communication between electric motor 602, external devices 604, and other electric motors 602, as described in detail below. In the exemplary embodiment, processor 606 is communicatively coupled to a motor management device 608, similar to motor management device 216 (shown in FIG. 3), configured to transmit input signals to one or more external devices 604 and/or other electric motors 602. Motor management device 608 is also configured to receive input signals from one or more external devices 604 and/or other electric motors 602. Similarly, external devices 604 each include a motor management device 610 for transmitting and receiving input signals to and from electric motor 602. In the exemplary embodiment, motor management devices 608 and 610 have antenna, similar to antenna 514 (shown in FIG. 5). Alternatively, motor management devices 608 and/or 610 are any device that enables electric motor communication system 600 to function as described herein.

In the exemplary embodiment, electric motor 602 communicates with external devices 604 and other electric motors 602 via Wi-Fi™, Z-Wave®, Bluetooth®, and/or BLE® signals. Alternatively, electric motor 602 communicates with external devices 604 and other electric motors 602 using any communication medium and/or network that enables electric motor communication system 600 to function as described herein. Exemplary networks include a mesh network, a cellular network, a general packet radio service (GPRS) network, an Enhanced Data Rates for Global Evolution (EDGE) network, a WiMAX network, a P1901 network, and/or a ZIGBEE® network (e.g., ZigBee Smart Energy 1.0, ZigBee Smart Energy 2.0, ZIGBEE® is a registered trademark of ZigBee Alliance, Inc., of San Ramon, Calif.).

A plurality of different types of external devices 604 may communicate wirelessly with electric motor 602. In the exemplary embodiment, external devices 604 may include a wireless network adapter 612 (such as BLE®-Wi-Fi™ gateway and home automation hub like Amazon Echo®), a database server 614, a diagnostic tool 616, sensors 618, a repeater 620 (e.g., a Bluetooth® repeater), and a computing device 622, each described in detail below. Alternatively, external devices 604 may include any device capable of communicating with electric motor 602 via input signals.

Wireless network adapter 612 uses wireless communication to interface with electric motor 602. In the exemplary embodiment, wireless network adapter 612 is in communication with one or more routers that may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. By being in communication with wireless network adapter 612, electric motor 602 may have access to database server 614, diagnostic tool 616, and any other device that electric motor 602 may require to gain access to function as described herein.

Database server 614 uses wireless communication to receive and store data related to operation of electric motor 602. In the exemplary embodiment, database server 614 includes a memory device, similar to memory device 516 (shown in FIG. 5). The data stored on database server 614 may include, for example, diagnostic information for electric motor 602, configuration data for electric motor 602, and/or measurements from motor management device 608. Data may be transmitted to database server 614 from electric motor 602 and, more specifically, motor management device 608 periodically, continuously, and/or in response to user input. In the exemplary embodiment, database server 614 is communicatively coupled to electric motor 602 via wireless adapter 612

Diagnostic tool 616 uses wireless communication to collect diagnostic information from electric motor 602. Diagnostic information may include, for example, input power consumption, operating speed, operating torque level, operating temperature, frequency of thermostat cycling, total number of failures of electric motor 602 (fault event count), total length of time that electric motor 602 has received power (total powered time), total length of time that electric motor 602 has operated at or above a preset threshold (total run time), total length of time that electric motor 602 has operated at a speed that exceeds a preset rate of speed (total time in a cutback region), total time that electric motor 602 has operated with a baseplate temperature over a preset thermal limit (total time over thermal limit), and/or total number of times that electric motor 602 has been started (total run cycles).

In the exemplary embodiment, the diagnostic information is stored in a memory device, similar to memory device 516, coupled to electric motor 602. In one embodiment, motor management device 608 of electric motor 602 periodically transmits diagnostic information stored to diagnostic tool 616 and/or other external devices 604. In another embodiment, motor management device 608 transmits diagnostic information in response to a request for diagnostic information sent by diagnostic tool 616 and/or other external devices 604.

In the exemplary embodiment, diagnostic tool 616 is a computing device that may include a presentation interface (not shown) that displays the diagnostic information to a user. The presentation interface may also display alerts and/or warnings to the user. For example, the presentation interface may display a warning when an operating configuration of electric motor 602 is malfunctioning, such as an operating temperature of electric motor 602 is above a predetermined threshold or when a voltage abnormality is detected. In another example, if diagnostic information indicates unusual operation of electric motor 602 indicative of malfunction of electric motor 602, the presentation interface may display an alert that electric motor 602 needs to be inspected and/or troubleshot. In response to observing the alert and/or warning, the user can take appropriate action.

Diagnostic tool 616 may further include a user input interface (not shown) that enables the user to request diagnostic information from electric motor 602 and/or control the information displayed on diagnostic tool 616. In the exemplary embodiment, diagnostic tool 616 is communicatively coupled to at least one electric motor 602, via a wireless network adapter 612. Accordingly, diagnostic tool 616 may be configured to wirelessly gather diagnostic information for a plurality of electric motors 602 in a relatively short period of time. For example, in some embodiments, diagnostic information is gathered from a plurality of electric motors 602 simultaneously using a single diagnostic tool 616. Diagnostic tool 616 is also configured to troubleshoot electric motor 602. For example, diagnostic tool 616 may identify a malfunction of electric motor 602 by using the collected diagnostic information. Once diagnostic tool 616 has identified the malfunction, diagnostics tool 616 generates a solution and transmits wirelessly the solution to the electric motor 602. The electric motor 602 receives the solution and processor 606 executes the solution to troubleshoot the malfunction.

Sensors 618 uses input signals to interface with electric motor 602. In the exemplary embodiment, sensors 618 include a $CO/NO_x$ sensor, a $CO_2$ sensor, a vibration sensor, a temperature sensor, a pressure transducer, an indoor air quality (IAQ) sensor, and/or a sensor that measures one or more operating parameters of electric motor 602. Alternatively, sensors 618 may include any type of sensor that enables electric motor communication system 600 to function as described herein.

In the exemplary embodiment, one or more measurements taken by sensors 618 are wirelessly transmitted to electric motor 602 via input signals. The operation of electric motor 602 is controlled based on the one or more measurements. For example, if sensors 618 measure ambient air temperature of electric motor 602 above a predetermined threshold, the processor may adjust one or more operating parameters (e.g., reduce the operating speed) of electric motor 602 in response. In the exemplary embodiment, sensors 618 include a plurality of user-selectable settings, or modes, related to operation of electric motor 602.

Repeater 620 uses a input signal transmitted by motor management device 608 from one electric motor 602 and rebroadcasts the input signal to another electric motor 602. In general, electric motor communication system 600 includes at least one repeater 620 when the physical distance between electric motors 602 is greater than a range that the input signals may reach. That is, for example, if the distance between two electric motors 602 is 400 feet and the input signal range is 328 feet, at least one repeater 620 would be required for the input signals to reach each electric motor 602. Conversely, if the distance between two electric motors 602 is 300 feet and the input signal range is 328 feet, it is likely that a repeater 620 would not be required for the input signals to reach each electric motor 602.

Figure 6B:
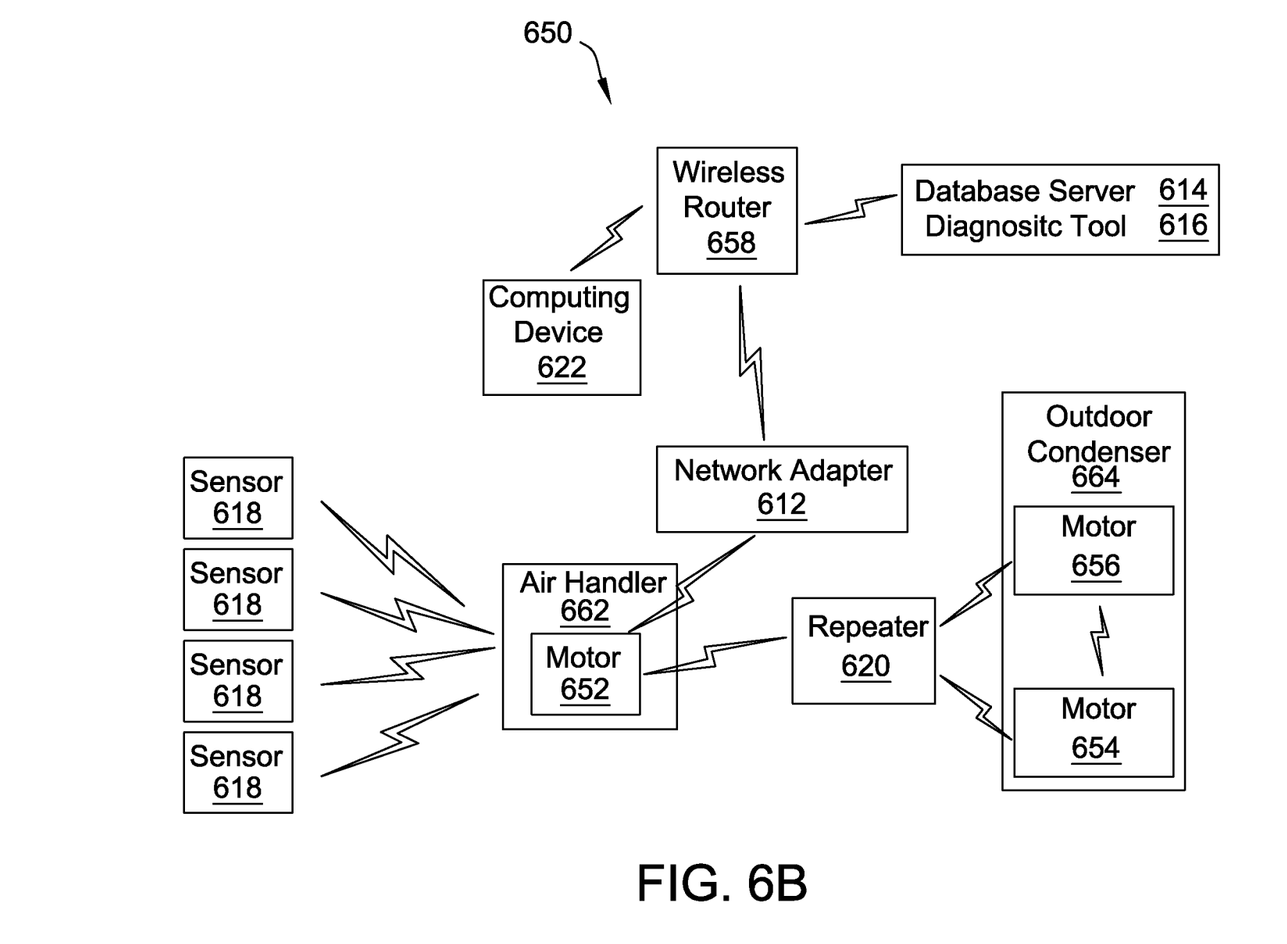
FIG. 6B is a schematic diagram of an alternative motor communication system that may be used with the electric motor shown in FIG. 1.

FIG. 6B is a schematic diagram of an electric motor communication system 650 implemented as part of an HVAC system. Electric motor communication system 650 includes wireless network adapter 612, database server 614, diagnostic tool 616, a plurality of sensors 618, a repeater 620, computing device 622, three electric motors 652, 654, and 656, and a wireless router 658. Electric motors 652, 654, and 656 are similar to electric motor 602 (shown in FIG. 6A). In the exemplary embodiment, electric motors 652, 654, and 656 are communicatively coupled with each other such that electric motors 652, 654, and 656 are capable of bi-directional wireless communication with each other. Electric motor 652 is communicatively coupled to sensors 618 such that electric motor 652 is capable of bi-directional wireless communication with sensors 618. Sensors 618 may include parameters related to low heat, high heat, cooling, dehumidify, and/or continuous fan modes.

In the exemplary embodiment, electric motor 652 is located inside an air handler 662 and is in communication with wireless network adapter 612, sensors 618, and repeater 620. Wireless router 658 enables communication between database server 614, diagnostic tool 616, and electric motors 652, 654, and 656. Wireless router 658 also enables communication between computing device 622 and electric motors 652, 654, and 656. In at least some implementation, when computing device 622, wireless adapter 612, and electric motors 652, 654, and 656 use similar wireless technology, such as Bluetooth® Low Energy (BLE®), a direct communication among them may be achieved. Electric motors 654 and 656 are located inside an outdoor condenser 664 and are in communication with electric motor 652 via repeater 620.

During operation, sensors 618 detect an ambient air temperature. In the exemplary embodiment, the detected air temperature is wirelessly transmitted to electric motor 652 via input signals. The operation of electric motors 652, 654, and 656 is controlled based on the detected air temperature. As a result, the three wireless communication based electric motors 652, 654, and 656 of the HVAC system operate in a self-driving mode (e.g., autonomous mode) without communicating to wireless adapter 612. More specifically, in the exemplary embodiment, electric motor 652 operates as a primary electric motor and is referred to as a "master" electric motor, and motors 654 and 656 operate as secondary motors and are referred to as "slave" electric motors. Therefore, the HVAC system operates within a master-slave control scheme. In an alternative embodiment, the operation of electric motors 652, 654, and 656 is controlled based on a temperature set in computing device 622, database server 614, and/or diagnostic tool 616. For example, if electric motor 652 is blowing cool air, when electric motor 652 receives a detected air temperature below a preset temperature, the processor of electric motor 652, such as processor 606 (shown in FIG. 6A), may instruct electric motors 652, 654, and 656 to cease rotation (i.e., stop blowing cool air) and to transmit, via repeater 620, a wireless signal to electric motors 654 and 656 instructing electric motors 654 and 656 to cease rotation.

In some embodiments, sensors 618 are at least one of a $CO/NO_x$ sensor, a $CO_2$ sensor, a vibration sensor, a temperature sensor, a pressure transducer, an indoor air quality (IAQ) sensor, an air flow sensor, a radon sensor, and a sensor that measures at least one operating parameter of electric motors 652.

Figure 6C:
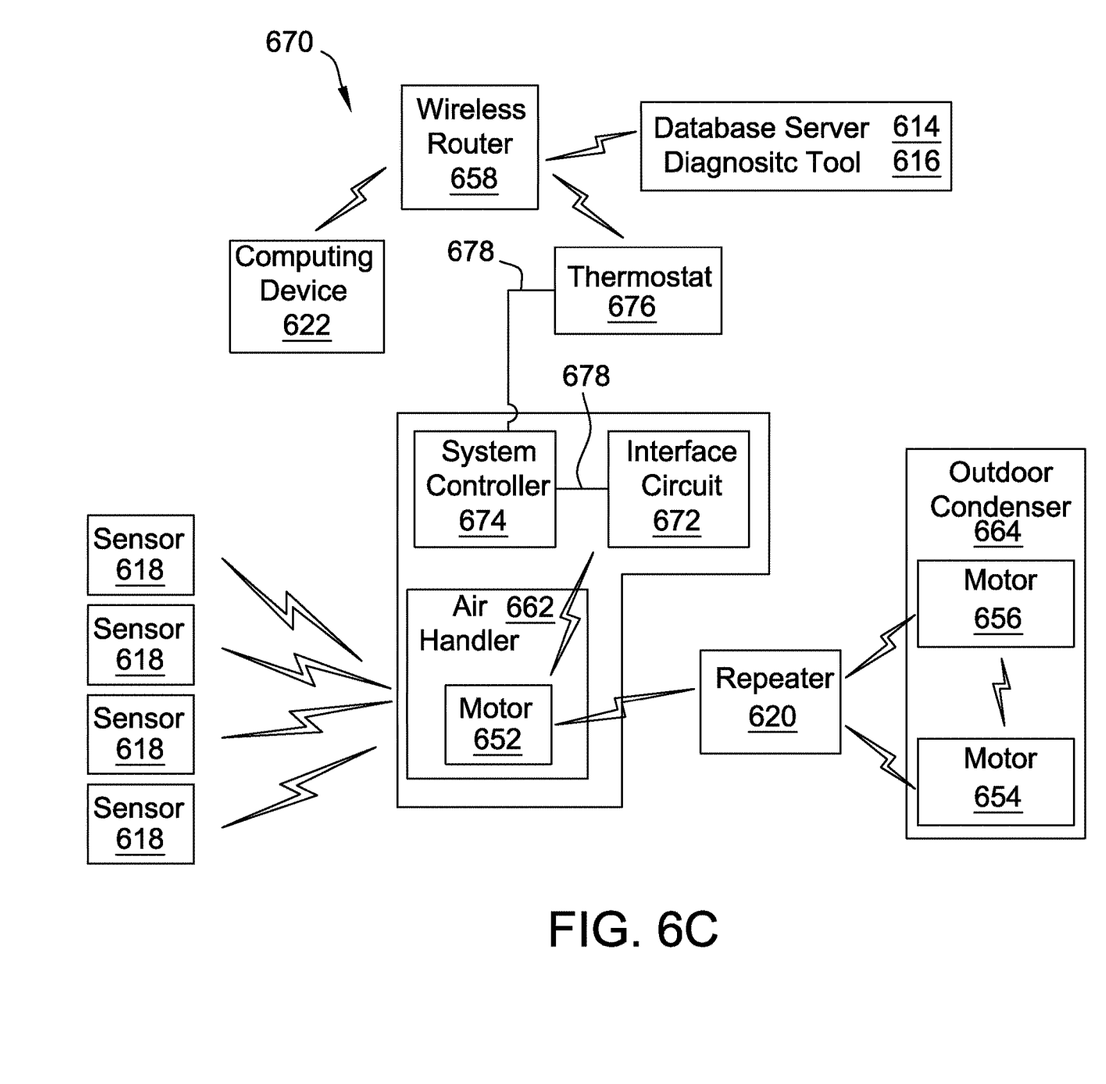
FIG. 6C is a schematic diagram of an alternative motor communication system that may be used with the electric motor shown in FIG. 1.

FIG. 6C is a schematic diagram of an alternative electric motor communication system 670 implemented as part of an HVAC system. Electric motor communication system 670 includes database server 614, diagnostic tool 616, a plurality of sensors 618, a repeater 620, computing device 622, three electric motors 652, 654, and 656, a wireless router 658, an interface circuit 672, a system controller 674 insider indoor unit, and a wireless thermostat 676. A wire communication connection 678 is used between thermostat 676 and system controller 674, and between system controller 674 and interface circuit 672. Interface circuit 672 has similar wireless communication technology (e.g., Bluetooth® Lower Energy) as electric motors 652, 654, and 656. Having similar wireless technology enables wireless communication between interface circuit 674 and electric motors 652, 654, and 656. In the exemplary embodiment, electric motor 652, interface circuit 672, and system controller 674 are located inside an air handler 662. Electric motor 652 is in communication with interface circuit 672, sensors 618, and repeater 620. Electric motors 654 and 656 are located inside an outdoor condenser 664 and are in communication with electric motor 652 via repeater 620.

During operation, wireless thermostat 660 detects ambient temperature and transmits at least one input signal to system controller 674 via wired communication connection 678. Subsequently, system controller 674 transmits the input signal to interface circuit 672 via wired communication connection 678. Then, interface circuit 672 wirelessly transmits the input signal to electric motor 652. Once electric motor 652 receives the input signal, electric motor 652 transmits the input to electric motors 654 and 656, via repeater 620, and activates the HVAC system. Similar to electric motor communication system 650 illustrated in FIG. 6B, the operation of electric motors 652, 654, and 656 may be controlled based on a detected air temperature from sensors 618. Electric motors 652, 654, and 656 may operate in a self-driving mode (e.g., autonomous mode) without communicating with computing device 622, thermostat 676, system controller 674, and/or interface circuit 672. In the exemplary embodiment, computing device 622 is in communication with wireless thermostat 676 via wireless router 658. Computing device 622 may be in direct communication with electric motors 652, 654, and 656 if computing device 622 and electric motors 652, 654, and 656 use similar wireless technology, such as Bluetooth® Lower Energy.

Figure 6D:
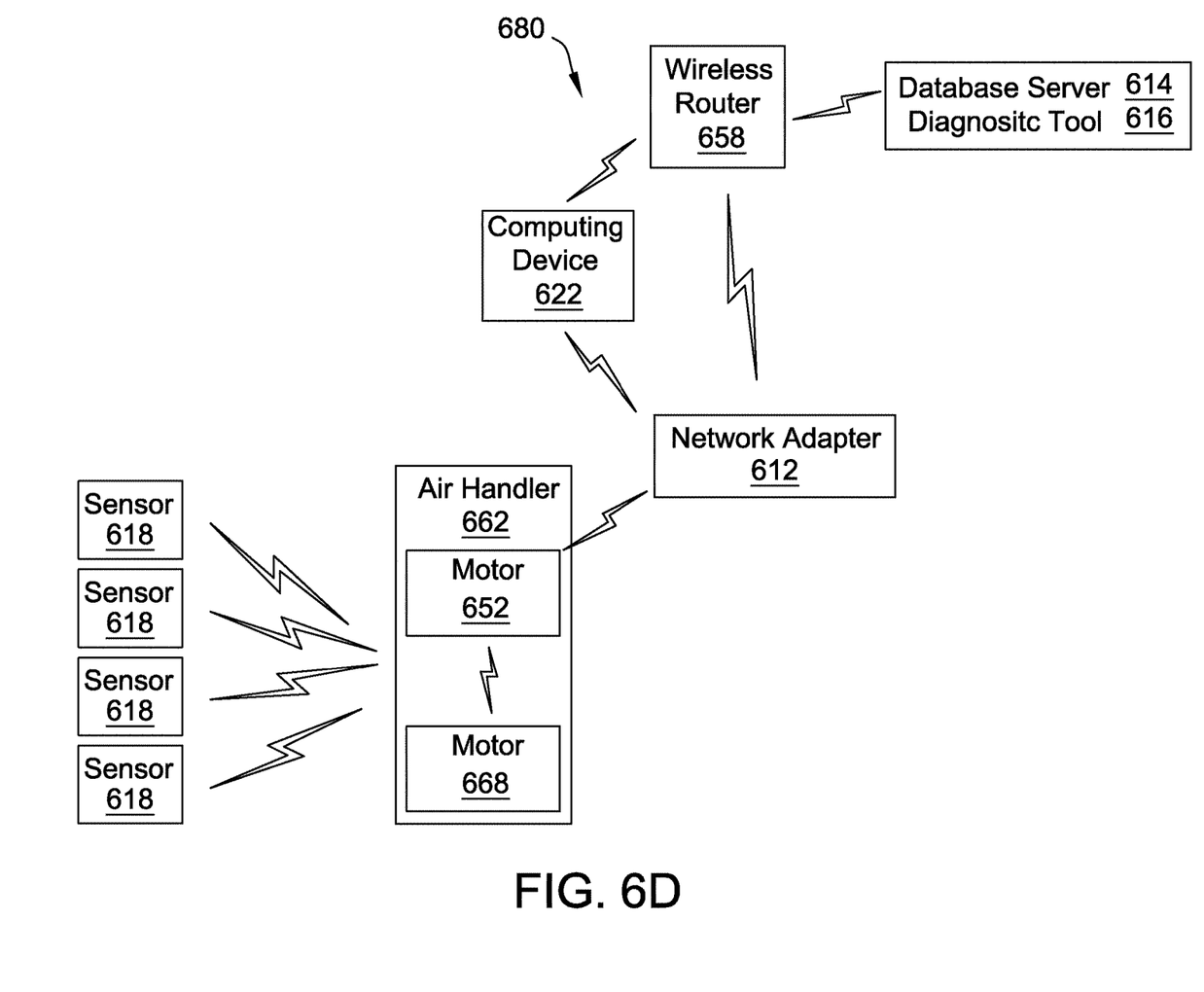
FIG. 6D is a schematic diagram of an alternative motor communication system that may be used with two electric motors similar to the electric motor shown in FIG. 1.

FIG. 6D is a schematic diagram of an alternative electric motor communication system 680 implemented as part of an HVAC system which uses two motors (e.g. gas furnace). Electric motor communication system 680 includes a wireless adapter 612, database server 614, diagnostic tool 616, a plurality of sensors 618, computing device 622, a wireless router 658, and two electric motors 652 and 668 located inside indoor unit 662. Electric motor 652 is in communication with wireless adapter 612, sensors 618, and electric motor 668. In the exemplary embodiment, sensors 618 detect air temperature and wirelessly transmit the detected air temperature, via an input signal, to electric motor 652. Then, electric motor 652 wirelessly transmits the input signal to electric motor 658. In some embodiments, electric motors 652 and 668 may operate in a self-driving mode (e.g., autonomous mode) without communicating with computing device 622 and/or wireless adapter 612. In other embodiments, computing device 622 may be in direct communication with electric motors 652 and 668 if computing device 622 and electric motors 652 and 668 use similar wireless technology, such as Bluetooth® Lower Energy.

Figure 7:
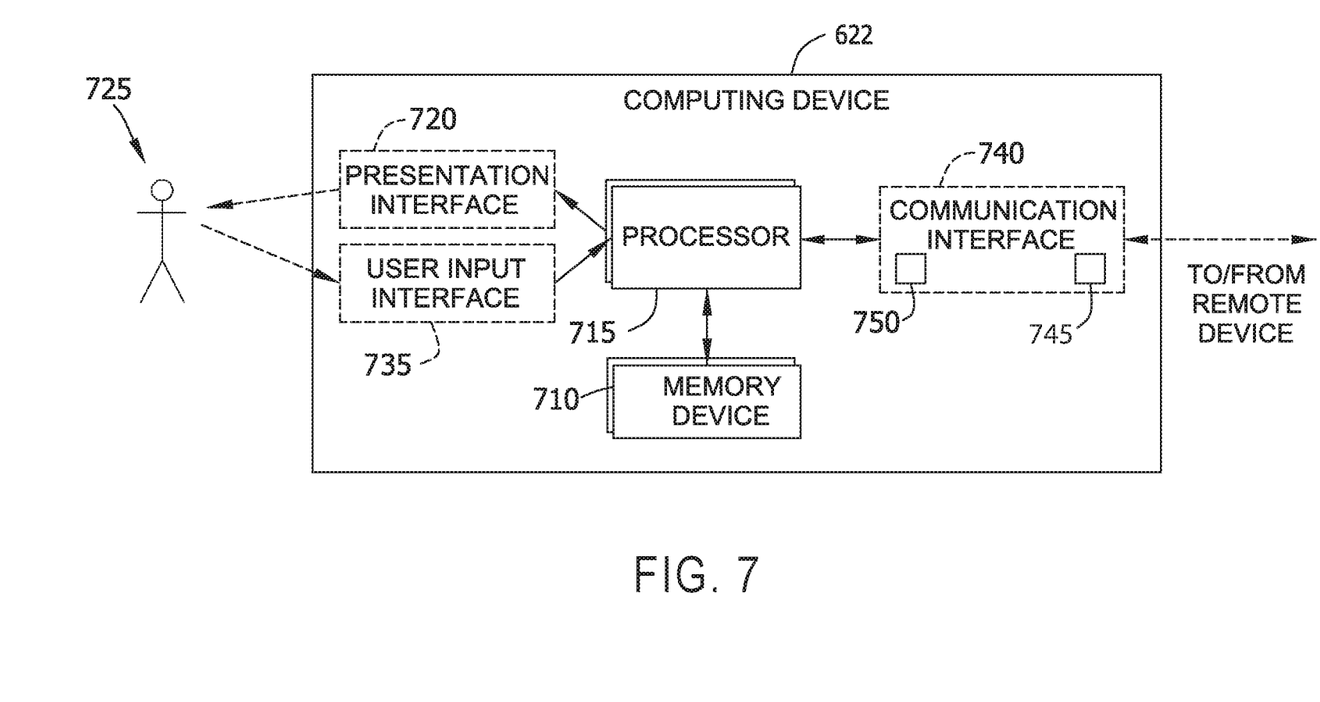
FIG. 7 is a block diagram of an exemplary computing device that may be used with the motor control assembly shown in FIG. 2.

FIG. 7 is a block diagram of computing device 622 that may be in communication with electric motor 10 (shown in FIG. 1). Computing device 622 may be any device capable of communicate with electric motor 602, but is not limited to, a desktop computer, a laptop computer, a personal digital assistant (PDA), a cellular phone, a smartphone, a tablet, a phablet, or other wireless connectable equipment. Computing device 622 includes at least one memory device 710 and a processor 715 that is coupled to memory device 710 for executing instructions. In some embodiments, executable instructions are stored in memory device 710. In the exemplary embodiment, computing device 622 performs one or more operations described herein by programming processor 715. For example, processor 715 may be programmed by encoding an operation as one or more executable instructions and by providing the executable instructions in memory device 710.

Processor 715 may include one or more processing units (e.g., in a multi-core configuration). Further, processor 715 may be implemented using one or more heterogeneous processor systems in which a main processor is present with secondary processors on a single chip. As another illustrative example, processor 715 may be a symmetric multi-processor system containing multiple processors of the same type. Further, processor 715 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 715 controls operation of electric motor 10 via an application programming interface (API). In alternative embodiments, a predefined configuration of electric motor 10 controls electric motor 10.

In the exemplary embodiment, memory device 710 is one or more devices that enable information such as executable instructions and/or other data to be stored and retrieved. Memory device 710 may include one or more computer readable media, such as, without limitation, dynamic random access memory (DRAM), static random access memory (SRAM), a solid state disk, and/or a hard disk. Memory device 710 may be configured to store, without limitation, application source code, application object code, source code portions of interest, object code portions of interest, configuration data, execution events, and/or any other type of data. In the exemplary embodiment, memory device 710 includes firmware and/or initial configuration data for electric motor 10.

In the exemplary embodiment, computing device 622 also includes a presentation interface 720 that is coupled to processor 715. Presentation interface 720 presents information, such as application source code and/or execution events, to a user 725. For example, presentation interface 720 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 720 includes one or more display devices.

Computing device 622 further includes user input interface 735 that enables user 725 to select a desired mode. When user 725 selects a mode, computing device 622 wirelessly transmits input signals to electric motor 10 that cause electric motor 10 to operate in accordance with the selected mode.

User input interface 735 is coupled to processor 715 and receives input from user 725. User input interface 735 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 720 and user input interface 735.

In the exemplary embodiment, where electric motor 10 is implemented in an HVAC system, sensors 618 (shown in FIG. 6) detect an ambient air temperature. In one embodiment, the detected air temperature is wirelessly transmitted to electric motor 10 via input signals. Motor management device 216 (shown in FIG. 3) receives the input signals and transmits the input signals to computing device 622. Computing device 622 may display the detected air temperature using presentation interface 720. Presentation interface 720 may also display the currently selected mode.

Computing device 622 includes a communication interface 740 coupled to processor 715. Communication interface 740 communicates with one or more electric motors 10. In the exemplary embodiment, communication interface 740 includes wireless communication unit 745, similar to wireless communication module 508 (shown in FIG. 5), and a signal converter 750 that converts the input signals received by wireless communication unit 745. For example, in one embodiment, signal converter 750 converts a input signal received by wireless communication unit 745 into a control signal that processor 715 utilizes to control operation of electric motor 10. Computing device 622 may include more or fewer components than those specifically shown in FIG. 7.

As compared to as least some known electric motor systems, the methods and systems described herein utilize wireless sensor networks. Using sensor connections, such as input signals in conjunction with wireless technology such as Bluetooth® technology, and controlling electric motor system from a centralized system (e.g., a motor control assembly) in place of several systems (e.g., a motor control assembly and external system controllers) facilitates reducing costs associated with implementing, maintaining, and operating electric motor systems. For example, a centralized system occupies less physical space as there is no need for additional hardware, and using input signal in conjunction with wireless communication such as Bluetooth® technology is generally reliable. Furthermore, as compared to at least some known electric motor systems, the systems and methods described herein enable configuring, controlling, and/or gathering data from a plurality of electric motors in a relatively short time period, and in some embodiments, simultaneously.

The systems and methods described herein facilitate efficient and economical implementation, maintenance, and operation of an electric motor system. Exemplary embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the methods and systems described and/or illustrated herein, the articles "a", "an", "the", and "said" are intended to mean that there are one or more of the element(s)/component(s)/etc.

The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric motor communication system for use with a fluid moving system, said electric motor communication system using at least one wireless sensor network, said electric motor communication system comprising:
   a plurality of electric motors communicatively coupled with each other using the wireless sensor network to transmit and receive input signals, each of the plurality of electric motors comprising:
   an electronics enclosure defining an internal chamber;
   a motor management device disposed within the internal chamber of said electronics enclosure configured to transmit and receive said input signals using the wireless sensor network, wherein the motor management device is positioned adjacent to an opening defined in the electronics enclosure:
   at least one sensor disposed within a heat sharing chamber within the internal chamber of said electronics enclosure and configured to measure and transmit at least one operating parameter associated with operation of an electric motor of the plurality of electric motors, the heat sharing chamber comprising an insulated material coupled to a heatsink; and
   a processing device coupled to said motor management device and configured to control said electric motor of the plurality of electric motors based at least in part on said input signals received from said motor management device and said at least one sensor; and
   at least one external transceiver device configured to collect data and to transmit said input signals, via the wireless sensor network, to said electric motor of the plurality of electric motors.

2. An electric motor communication system in accordance with claim 1, wherein said motor management device is configured to transmit said input signals that include configuration data for said electric motor of the plurality of electric motors, wherein said input signals are one of a sensor signal and a control signal.

3. An electric motor communication system in accordance with claim 1, wherein said fluid moving system is a heating, ventilation, and air conditioning (HVAC) system.

4. An electric motor communication system in accordance with claim 1, wherein said at least one external device is a diagnostic tool configured to wirelessly collect diagnostic information from said electric motor of the plurality of electric motors.

5. An electric motor communication system in accordance with claim 1, wherein said at least one external device is a computing device including a plurality of user-selectable modes and configured to transmit sjd input signals including control commands to said electric motor of the plurality of electric motors that cause said electric motor of the plurality of electric motors to operate in accordance with a selected mode of the plurality of user-selectable modes.

6. An electric motor communication system in accordance with claim 1, wherein said at least one external device is a sensing device configured to wirelessly transmit sensor measurements to said electric motor of the plurality of electric motors.

7. An electric motor communication system in accordance with claim 6, wherein said sensing device is at least one of a CO/NOx sensor, a CO2 sensor, a vibration sensor, a temperature sensor, a pressure transducer, an indoor air quality (IAQ) sensor, air flow sensor, radon sensor, and a sensor that measures at least one operating parameter of said electric motor of the plurality of electric motors.

8. An electric motor communication system in accordance with claim 1, wherein said at least one external device is a database server configured to wirelessly receive and store information from said electric motor of the plurality of electric motors.

9. An electric motor communication system in accordance with claim 1, wherein said input signals comprise wireless signals including at least one of a Wi-Fi, Z-Wave, a Bluetooth, and a Bluetooth Low Energy signal.

10. An electric motor communication system in accordance with claim 1, wherein said input signals are configured to update configuration data stored in said electric motor of the plurality of electric motors.

11. An electric motor for use in a fluid-moving system, said electric motor in communication with a wireless sensor network, said electric motor comprising:
    an electronics enclosure defining an internal chamber;
    a motor management device disposed within the internal chamber of said electronics enclosure and configured to transmit and receive input signals, using the wireless sensor network, to and from at least one external transceiver device, and to and from at least one electric motor, wherein the motor management device is positioned adjacent to an opening defined in the electronics enclosure;
    at least one sensor disposed within a heat sharing chamber within the internal chamber of said electronics enclosure and configured to measure and transmit at least one operating parameter associated with operation of said electric motor, the heat sharing chamber comprising an insulated material coupled to a heatsink; and
    a processing device coupled to said motor management device and configured to control said electric motor based at least in part on said input signals received from said motor management device and said at least one sensor.

12. An electric motor in accordance with claim 11, wherein said motor management device is configured to transmit and receive said input signals comprising one of a sensor signal and a control signal to and from at least one of a computer device, a diagnostic tool, a database server, a wireless adapter, a wireless motor, and a sensor.

13. An electric motor in accordance with claim 12, wherein said input signals comprising one of a sensor signal and a control signal are configured to update configuration data stored in said electric motor.

14. An electric motor in accordance with claim 12, wherein said diagnostic tool is configured to wirelessly collect diagnostic information from said electric motor and transmit a solution to said electric motor to troubleshoot said electric motor.

15. An electric motor in accordance with claim 11, wherein said input signals comprising one of a sensor signal and a control signal are wireless signals including at least one of a Wi-Fi, a Z-Wave, a Bluetooth, and a Bluetooth Low Energy signal.

16. A method of operating a first electric motor in a fluid-moving system, said method performed using a wireless sensor network, said method comprising:
    communicatively coupling the first electric motor to at least one external transceiver device and at least one second electric motor, using the wireless sensor network, the first electric motor including an electronics enclosure defining an internal chamber, a motor management device positioned adjacent to an opening defined in the electronics enclosure and disposed within a heat sharing chamber within the internal chamber of the electronics enclosure, the heat sharing chamber comprising an insulated material coupled to a heatsink, at least one sensor disposed within the internal chamber of the electronics enclosure, and a processing device coupled to the motor management device;
    receiving, at the motor management device, input signals from the at least one external transceiver device and the at least one second electric motor;
    transmitting, from the at least one sensor to the processing device, at least one operating parameter, measured at the at least one sensor, associated with operation of said first electric motor; and
    controlling, using the processing device, the first electric motor based at least in part on the received in signals from said motor management device and said at least one sensor.

17. A method in accordance with claim 16, wherein said receiving input signals comprises receiving the input signals from a computing device, wherein the input signals received from the computing device include control commands that cause the first electric motor to operate in accordance with a selected mode of a plurality of user-selectable modes.

18. A method in accordance with claim 16, wherein said receiving input signals comprises receiving the input signals from a sensor that includes configuration data for the first electric motor.

19. A method in accordance with claim 16, wherein said receiving input signals comprises receiving the input signals that include transmitting a solution to the first electric motor to troubleshoot the first electric motor.

20. A method in accordance with claim 16, wherein said receiving input signals comprises receiving hg input signals that include transmitting update configuration data stored in the first electric motor.

\* \* \* \* \*